(12) United States Patent
Tsurumi

(10) Patent No.: US 9,529,444 B2
(45) Date of Patent: Dec. 27, 2016

(54) RECORDING AND REPRODUCING APPARATUS

(71) Applicant: SONY CORPORATION, Tokyo (JP)

(72) Inventor: Takehiko Tsurumi, Tokyo (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 14/497,456

(22) Filed: Sep. 26, 2014

(65) Prior Publication Data

US 2015/0012894 A1    Jan. 8, 2015

Related U.S. Application Data

(63) Continuation of application No. 12/272,017, filed on Nov. 17, 2008, now Pat. No. 8,872,760.

(30) Foreign Application Priority Data

Nov. 22, 2007   (JP) ................. 2007-302555

(51) Int. Cl.
| | |
|---|---|
| *G06F 3/01* | (2006.01) |
| *G06F 3/0484* | (2013.01) |
| *G06F 3/0485* | (2013.01) |
| *G06F 3/0482* | (2013.01) |
| *G06F 3/03* | (2006.01) |

(52) U.S. Cl.
CPC ............. *G06F 3/017* (2013.01); *G06F 3/0304* (2013.01); *G06F 3/0482* (2013.01); *G06F 3/0485* (2013.01); *G06F 3/04845* (2013.01)

(58) Field of Classification Search
CPC .... G06F 3/017; G06F 3/04845; G06F 3/0304; G06F 3/0482; G06F 3/0485
See application file for complete search history.

(56) References Cited

U.S. PATENT DOCUMENTS

| 5,594,469 | A | 1/1997 | Freeman et al. |
| 6,191,773 | B1 * | 2/2001 | Maruno .................. G06F 3/017 |
| | | | 345/156 |
| 6,466,237 | B1 | 10/2002 | Miyao et al. |
| 6,498,628 | B2 | 12/2002 | Iwamura |
| 2006/0022961 | A1 | 2/2006 | Kaminaga |
| 2006/0150215 | A1 * | 7/2006 | Wroblewski .......... G06F 3/0236 |
| | | | 725/47 |

FOREIGN PATENT DOCUMENTS

| JP | 07-084714 | 3/1995 |
| JP | 09-185456 | 7/1997 |
| JP | 9-237151 | 9/1997 |
| JP | 2000-105772 | 4/2000 |
| JP | 2000-187554 | 7/2000 |
| JP | 3122736 | 10/2000 |
| JP | 2003-330611 | 11/2003 |
| JP | 2004-104594 | 4/2004 |
| JP | 2006-40050 | 2/2006 |
| JP | 2006-323260 | 11/2006 |
| JP | 2007-128497 | 5/2007 |

\* cited by examiner

*Primary Examiner* — Andrew Sasinowski
(74) *Attorney, Agent, or Firm* — Paratus Law Group, PLLC

(57) ABSTRACT

A recording and reproducing apparatus includes: a recording means for storing a plurality of images in groups; a display means for displaying images stored in the recording means; a detecting means for detecting a part of a human body or an object in a predetermined form; and a display switching means for switching images to be displayed on the display means in accordance with a form of a part of a human body or a form of an object detected by the detecting means.

12 Claims, 19 Drawing Sheets

FRONT VIEW

REAR VIEW

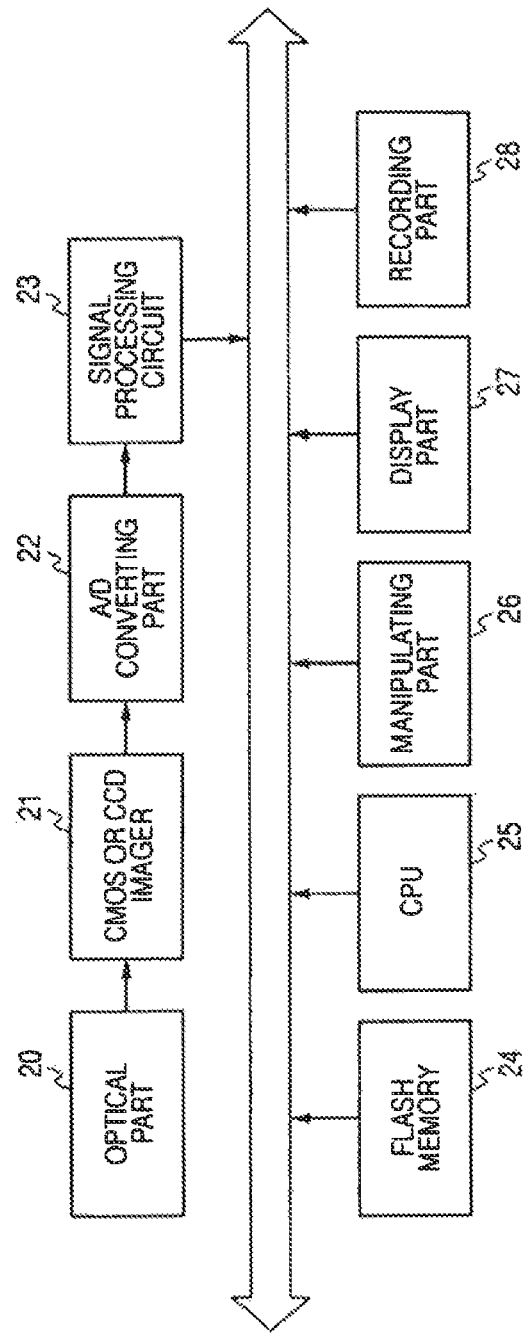

FIG. 5A DISPLAY SCREEN

FIG. 5B EXTERNAL VIEW

CHART A

EXTERNAL VIEW

DISPLAY SCREEN

EXTERNAL VIEW

DISPLAY SCREEN

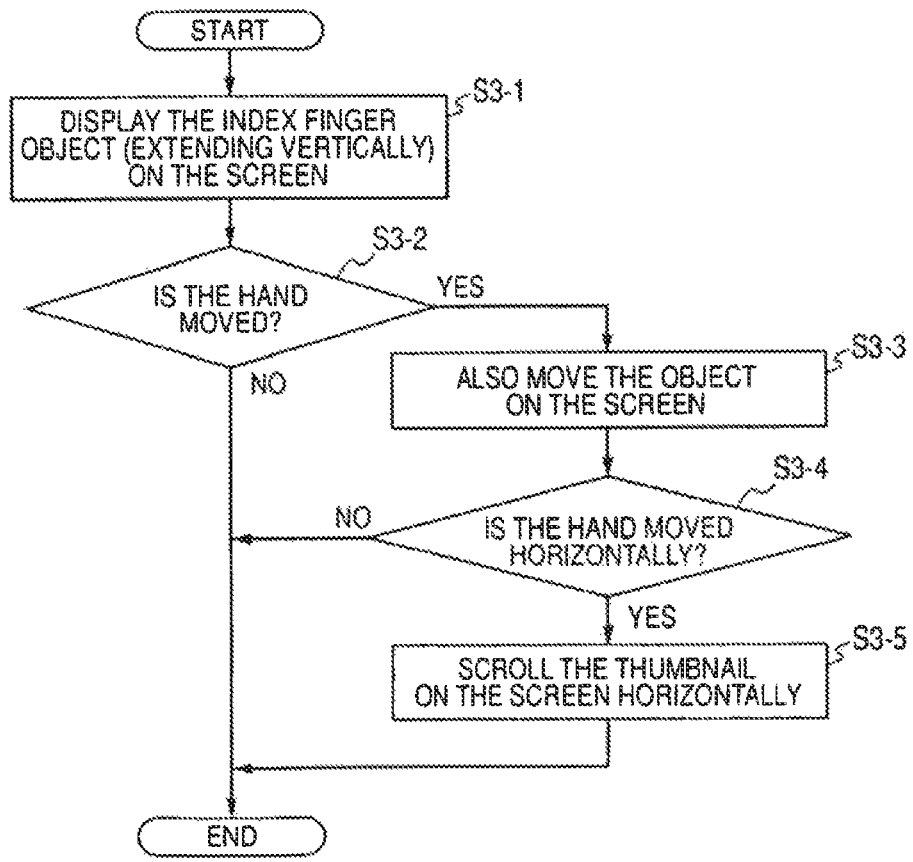

EXTERNAL VIEW

DISPLAY SCREEN

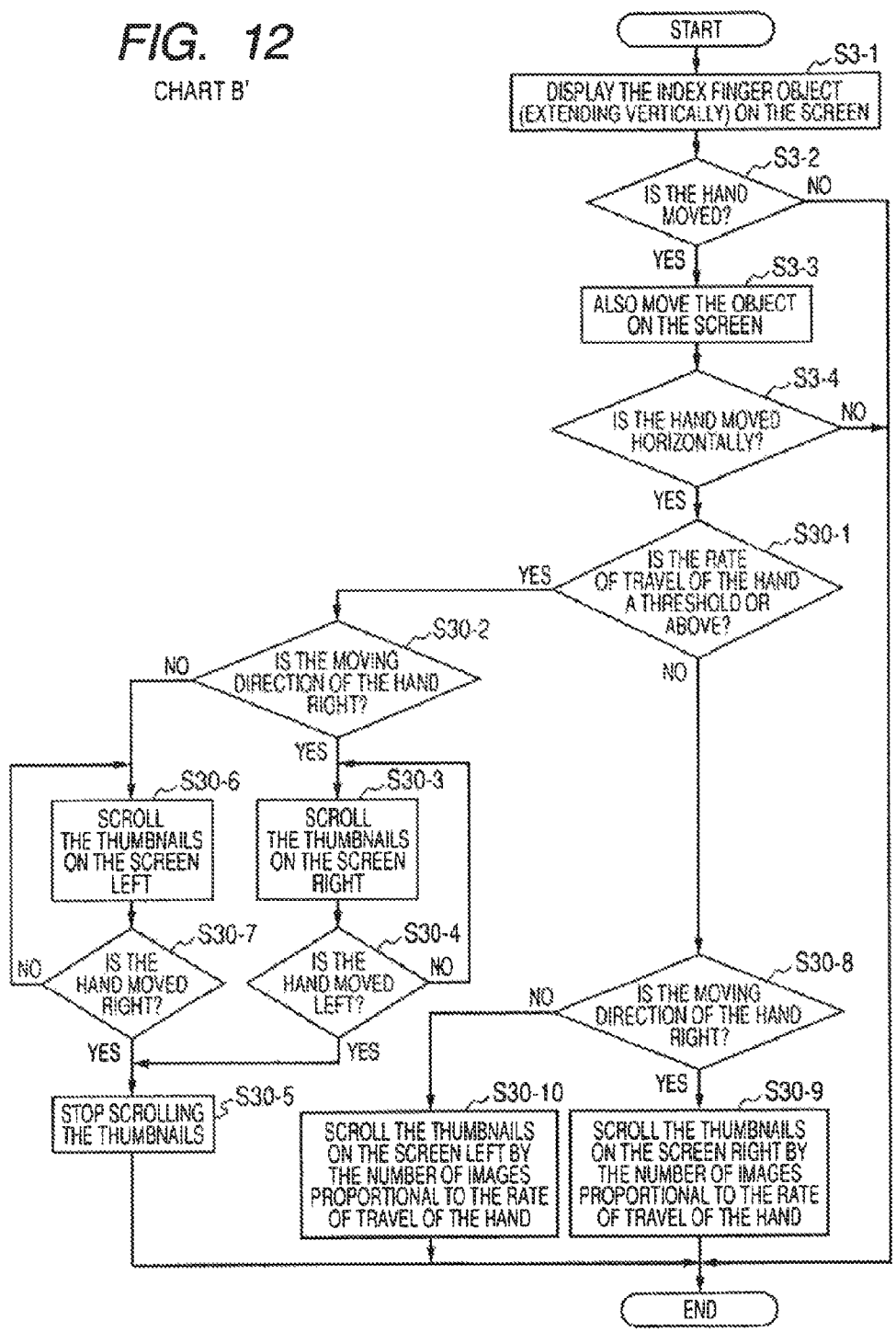

EXTERNAL VIEW

DISPLAY SCREEN

CHART C

EXTERNAL VIEW

DISPLAY SCREEN

CHART C'

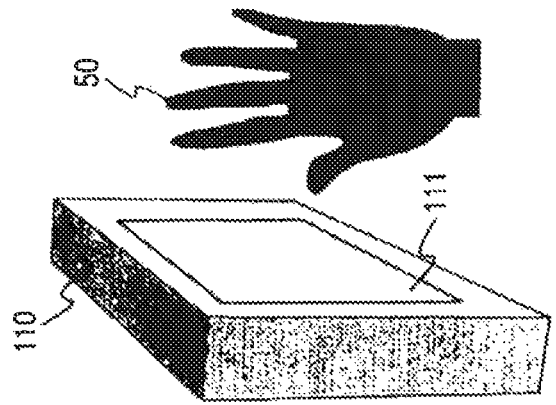
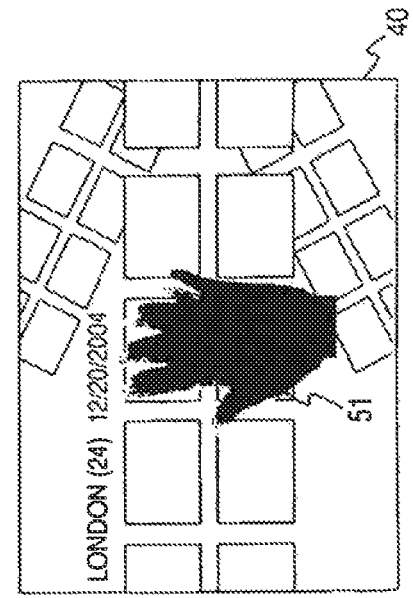

EXTERNAL VIEW

DISPLAY SCREEN

LONDON (24) 12/20/2004

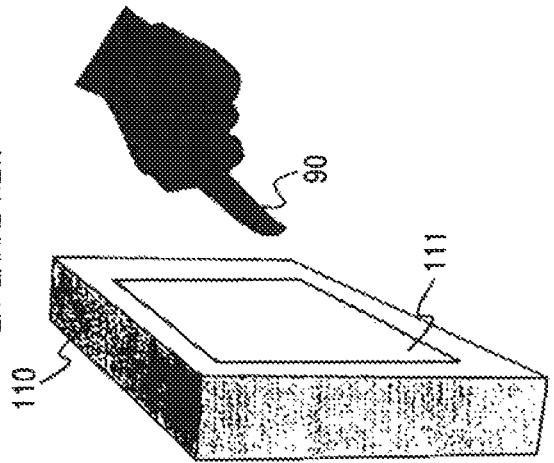
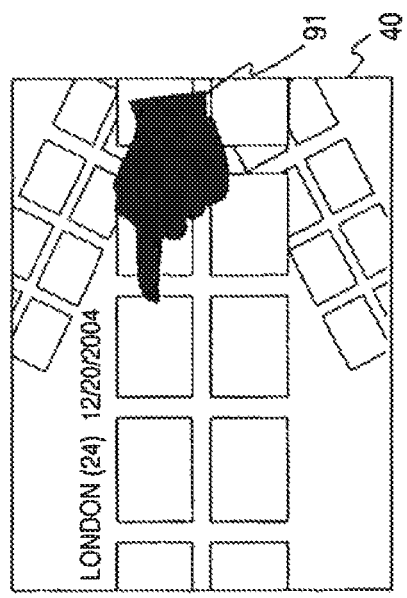

RECORDING AND REPRODUCING APPARATUS

CROSS REFERENCE TO PRIOR APPLICATION

This application is a continuation of U.S. patent application Ser. No. 12/272,017 (filed on Nov. 17, 2008), which claims priority to Japanese Patent Application No. 2007-302555 (filed Nov. 22, 2007), which are all hereby incorporated by reference in their entirety.

BACKGROUND OF THE INVENTION

1. Field of the Invention

The present invention relates to a recording and reproducing apparatus that improves ease of operation in searching for an object image in a large number of images, for example.

2. Description of the Related Art

In recent years, the capacity of a semiconductor memory is increasing more and more and prices thereof are lower and lower. Even portable appliances such as a PDA (Personal Digital Assistant) and a digital camera use a large capacity semiconductor memory. Thus, the number of images that can be recorded on a single recording medium continues to incise, and such an interface is demanded that finds an object image in a large number of images recorded on a recording medium with a simple operation for a short time.

Among this kind of interfaces, the most popular is a scheme in which a plurality of thumbnails are collectively displayed and these thumbnails are in turn advanced with a cross key, a jog dial or the like. However, the display area provided on a portable appliance is narrow because the area is proportional to the case size. As the result, when thumbnails are displayed, the total number of thumbnails displayed atone time becomes small, which causes a disadvantage that it is difficult to conduct a file search. In addition, it is necessary to mount a cross key or a jog dial on a portable appliance for operations, which also causes a problem that the case becomes larger correspondingly, or the display area becomes narrower.

As a means for solve the former problem, in recent years, such a scheme is proposed that thumbnails are arranged three-dimensionally to allow a user to easily confirm a large number of thumbnails even in a narrow display area of a small sized portable appliance for facilitating a file search as disclosed in Patent Reference 1 (JP-A-2000-105772).

In addition, in order to solve the latter problem, such a scheme is proposed that a touch panel is mounted to eliminate an input device such as a cross key or a jog dial for improving ease of use in searching for an object image in a large number of images as disclosed in Patent Reference 2 (JP-A-2006-40050),

SUMMARY OF THE INVENTION

However, in the scheme according to Patent Reference 1, the three-dimensional arrangement of thumbnails allows the improvement of visibility. However, because the scheme considers mounting a cross key, a jog dial, a touch panel, or the like as to ease of operation of an interface, there are no differences from existing portable appliances.

In addition, also in the scheme according to Patent Reference 2, the elimination of an input device such as a cross key or a jog dial provides the improvement of visibility as the display area is increased. However, because of mounting a touch panel; the touch panel according to the invention of Patent Reference 2 can provide only such input operations. "press", "release" and a simple "rotation". As the result, the functions of the cross key and the jog dial are merely reproduced on the touch panel, and as to ease of operation, there are no great improvements in ease of operation as compared with the cross key and the jog dial.

Heretofore, the portable appliance has small buttons, a small cross key or a small touch panel because of the smallness of its case. On this account, its ease of operation is not always excellent, and it is demanded to provide a user interface with excellent ease of operation instead of these small sized components. In addition, the interfaces before often ask users to read manuals for practices, and there is a problem that it is difficult for unskilled users to operate a portable appliance by intuition.

Thus, it is desirable to provide a recording and reproducing apparatus that has an intuitive interface function by which ease of operation is improved in searching for an object image in a large number of images even on a small sired appliance such as a portable appliance.

An embodiment of the invention is directed to a recording and reproducing apparatus including; a recording means for storing a plurality of images in groups; a display means for displaying images stored in the recording means; a detecting means for detecting a part of a human body or an object in a predetermined form; and a display switching means for switching images to be displayed on the display means in accordance with a form of a part of a human body or a form of an object detected by the detecting means.

In a recording and reproducing apparatus according to another embodiment of the invention, when a form of a part of a human body or a form of an object detected by the detecting means is a first form, the display switching means displays a first object that switches the displayed image so as to move the first object together with a motion of the part of the human body or the object in the first form.

In a recording and reproducing apparatus according to still another embodiment of the invention, when a form of a part of a human body or a form of an object detected by the detecting means is a second form, the display switching means displays a second object that switches the displayed image so as to move the second object together with a motion of the part of the human body or the object in the second form, and the display switching means moves the displayed image as the displayed image moving together with the motion of the part of the human body or the object for switching.

In a recording and reproducing apparatus according to still another embodiment of the invention, when a form of a part of a human body or a form of an object detected by the detecting means is a third form, the display switching means displays a third object that switches the displayed image so as to move the third object together with a motion of the part of the human body or the object in the third form, and the display switching means moves the displayed image as the displayed image moving together with the motion of the part of the human body or the object for switching.

In a recording and reproducing apparatus according to still another embodiment of the invention, when a rate of travel of the part of the human body or the object in the second form detected by the detecting means is a predetermined speed or above, the display switching means moves the image faster than an image travel rate when the rate of travel is a predetermined speed or below.

In a recording and reproducing apparatus according to still another embodiment of the invention, when a rate of travel of the part of the human body or the object in the third form detected by the detecting means is a predetermined speed or above, the display switching means moves the image faster than an image travel rate when the rate of travel is a predetermined speed or below.

In a recording and reproducing apparatus according to still another embodiment of the invention, the display means horizontally displays images in a main group at a center, and displays images in a group adjacent to the main group above and below the displayed images in the main group.

In a recording and reproducing apparatus according to still another embodiment of the invention, the display switching means moves the displayed image horizontally.

In a recording and reproducing apparatus according to still another embodiment of the invention, the display switching means moves the displayed image vertically.

In a recording and reproducing apparatus according to still another embodiment of the invention, the detecting means has a CCD or a CMOS imager, and the display means has a liquid crystal panel.

In a recording and reproducing apparatus according to still another embodiment of the invention, the detecting means and display means are configured by a liquid crystal panel having an optical sensor incorporated therein.

In a recording and reproducing apparatus according to still another embodiment of the invention, the display means displays a group name of images in the main group simultaneously.

According to the embodiments of the invention, when user is desired to find an object image in a large number of images recorded on a recording medium of the recording and reproducing apparatus, the user can operate the apparatus by intuition according to a part of a human body or an object in a predetermined form, a gesture of fingers, for example, without touching a product. Thus, the user can quickly find the object image in an excellent ease of operation with no influence of the size of the product. Particularly, in a small-sized appliance such as a digital camera and a PDA on which it is difficult to mount a button or a touch panel in the size of an excellent ease of operation, the embodiment of the invention is effective.

In addition, according to the embodiments of the invention, depending on a form of a part of a human body or a form of an object, that is, for example, gestures of fingers allow instructions of a plurality of different operations. Thus, it is unnecessary to provide buttons or the like corresponding to different operations as before, which eliminates providing extra buttons on the product or showing icons for operations on the screen, and allows the display screen to be extended by the widened space or the product to be made smaller. In addition, for the gestures of fingers, the motions to think of the operations that a user does in daily life are adapted. Thus, it is unnecessary for the user to do particular practices, and the user can operate an appliance by intuition.

In addition, according to the embodiments of the invention, the displayed image can be moved at high speed, and the object image can be found more quickly.

In addition, according to the embodiments of the invention, not only the images in the main group but also the images in the adjacent group can be visually seen for an easy image search.

In addition, according to the embodiments of the invention, the configuration of the apparatus can be simplified.

In addition, according to the embodiments of the invention, the group name of images in the main group can be easily recognized.

BRIEF DESCRIPTION OF THE DRAWINGS

FIG. 1A shows a front views, and FIG. 1B shows a rear view;

FIG. 2 shows a block diagram depicting the recording and reproducing apparatus according to the first embodiment of the invention;

FIG. 5A shows an illustration depicting a display screen, and FIG. 5B shows an external view;

FIG. 8B shows an external view;

FIG. 9A shows an illustration depicting a display screen, and FIG. 9B shows an external view;

FIG. 10 shows a flow chart partially depicting the operation of the recording and reproducing apparatus according to the embodiment of the invention;

FIG. 11A shows an illustration depicting a display screen, and FIG. 11B shows an external view;

FIG. 12 shows a flow chart partially depicting the operation of the recording and reproducing apparatus according to the embodiment of the invention;

FIG. 13A shows an illustration depicting a display screen, and FIG. 13B shows an external view;

FIG. 15A shows an illustration depicting a display screen, and FIG. 15B shows an external view;

FIGS. 17A and 17B show an operating method in the browsing mode in a recording and reproducing apparatus according to a second embodiment of the invention, FIG.

17A shows an illustration depicting a display screen, and FIG. 17B shows an external view;

FIG. 18A shows an illustration depicting a display screen, and FIG. 18B shows an external view; and FIGS. 19A and 19B show an operating method in the browsing mode in the recording and reproducing apparatus according to the second embodiment of the invention, FIG. 19A shows an illustration depicting a display screen, and FIG. 19B shows an external view.

DESCRIPTION OF THE PREFERRED EMBODIMENTS

Hereinafter, embodiments of the invention will be described with reference to the drawings, which are not limited to the following exemplary embodiments.

Figure 1A:
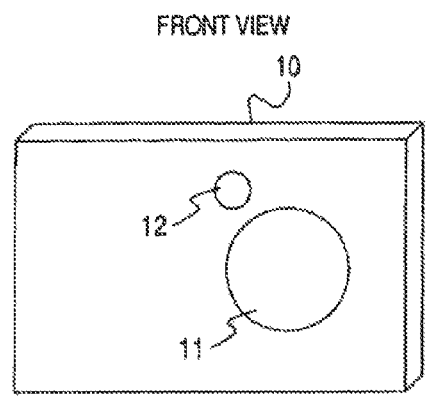
FIGS. 1A and 1B show diagrams depicting a recording and reproducing apparatus according to a first embodiment of the invention.
Figure 1B:
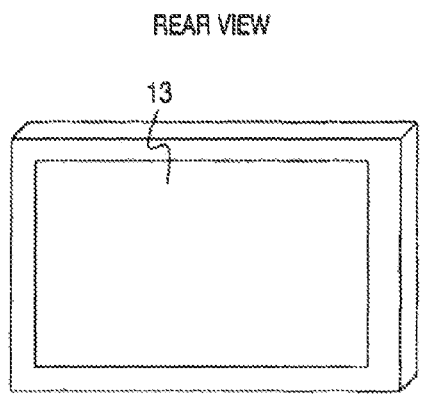

FIGS. 1A and 1B show external views of a recording and reproducing apparatus 10 according to a first embodiment of the invention. The recording and reproducing apparatus 10 is a portable information display terminal with a camera such as a mobile telephone and a FDA, or a digital still camera, in which as shown in FIG. 1A, a window 11 that takes in the subject light from a subject, and a lighting window 12 that throws fill light toward the subject are provided on the front side of a case. In addition, as shown in FIG. 1B, an image display device 13 such as an LCD panel is provided on the rear side of the case of the recording and reproducing apparatus 10.

FIG. 2 shows a block diagram depicting an exemplary internal configuration of the recording and reproducing apparatus 10. In FIG. 2, the light inputted from an optical part 20 (detecting means) having a lens, a diaphragm, a filter and the like is subjected to photoelectric conversion by an imaging device such as an imager 21 (detecting means), and is supplied to an A/D converting part 22 that converts analog data into digital data. The image data converted into digital data is processed by a signal processing circuit 23 that compresses still image data, and recorded in a recording part 28 (recording means).

The recording part 28 may be a removable recording medium, or may be a built-in hard disk or a flash memory, A photographer can turn on and off a power supply and make imaging operations with a manipulating part 26 having a power supply switch, a shutter and the like.

The recording and reproducing apparatus 10 has a shooting mode and a browsing (reproducing) mode, in which in reproducing images, image data stored in the recording part 28 can be read and displayed at any time by a display part 27 (display means) having the image display device 13.

24 depicts a rewritable flash memory on which setting values for the outline of image recognition, template images for comparison, predetermined parameters, programs and the like are recorded to be used for a form of a part of a human body or a form of an object, for example, a hand, which is detected by the optical part 20 and the imager 21 described below.

25 depicts a CPU (display switching means) that controls processing in the recording and reproducing apparatus 10, and that reads necessary data out of the flash memory 24 at any time, computes, writes data to the recording part 28 and the like. In addition, in FIG. 2, a light source that throws fill light, or the like is omitted in the drawing.

Figure 3:
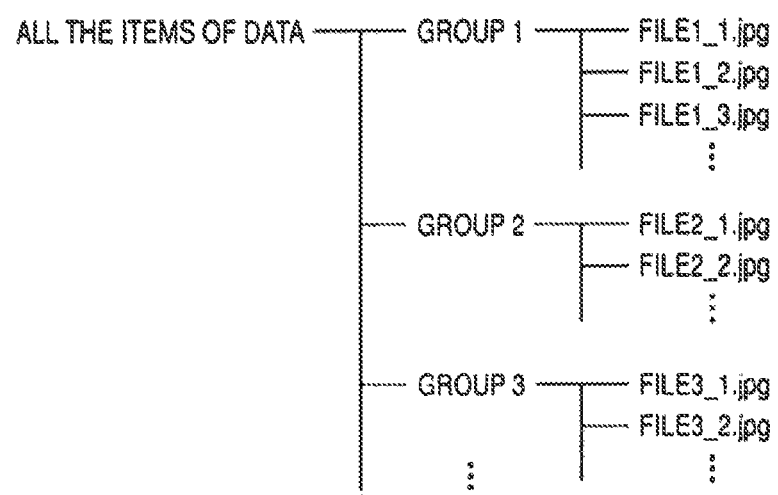
FIG. 3 shows an illustration depicting an exemplary data structure recorded on a recording part according to an embodiment of the invention.

For example, the data structure in the recording part 28 is as shown in FIG. 3, and the image data is grouped according to every taken date and time, or taken piece (GPS), and recorded in every group. For instance, when the recording and reproducing apparatus 10 is mounted with a GPS, it is assumed that all the items of image data are grouped at every taken place based on GPS information when taken.

Next, a display screen and an operating method of the browsing mode in the recording and reproducing apparatus 10 will be described with reference to FIGS. 4 to 16. In addition, FIG. 6 shows a flow chart depicting processing executed by the CPU 25.

Figure 4:
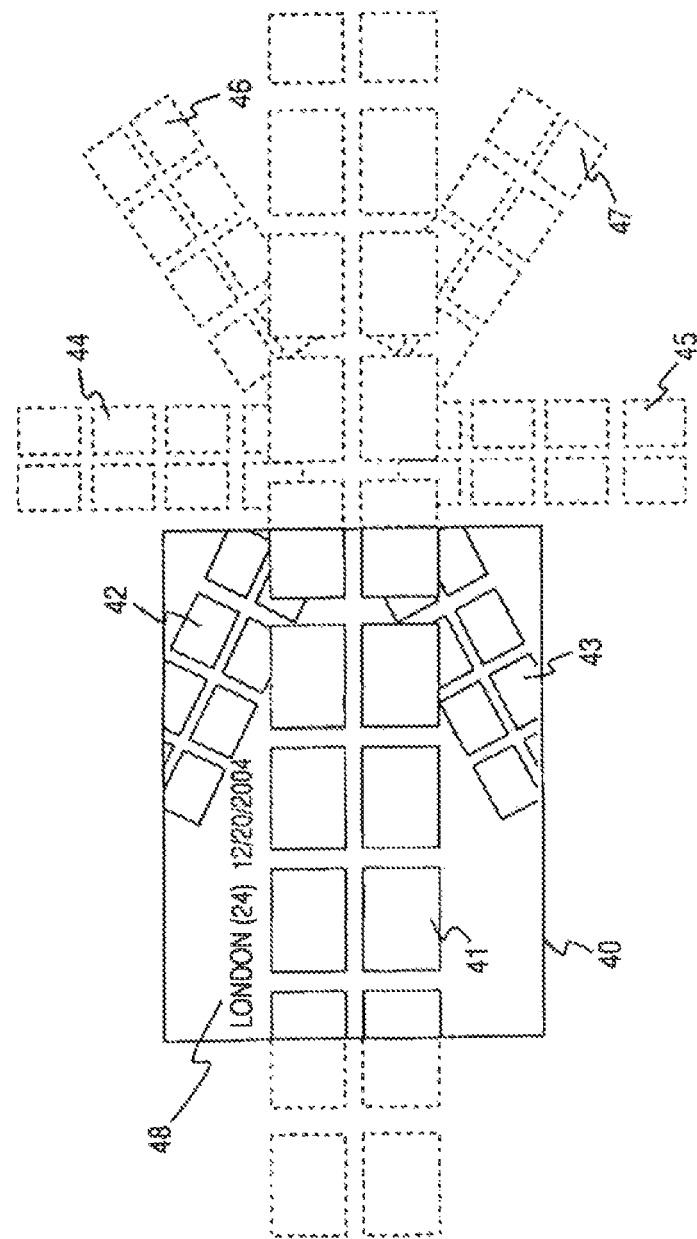
FIG. 4 shows an illustration depicting the arrangement of image data in the browsing mode in the recording and reproducing apparatus according to the embodiment of the invention.
Figure 5:
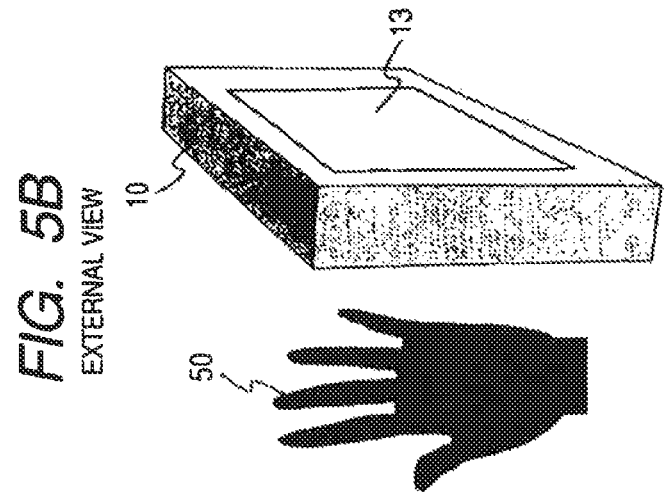
FIGS. 5A and 5B show an operating method in the browsing mode in the recording and reproducing apparatus according to the embodiment of the invention.

FIG. 4 shows a display screen 40 of the image display device 13 in the browsing mode of the recording and reproducing apparatus 10. On the display screen 40, image data of a group 41 currently browsing is displayed in the thumbnail format in two lines at the center of the screen. In the group 41, portions depicted in a dotted line are portions outside the display area of the screen 40. For example, a user can see the group 41 by scrolling the group 41 horizontally in accordance with intuition operations with a virtual hand, described later.

In addition, a group name 98 of the group 41 is displayed on the display screen 40 together with the created date and time and the number of images. In addition, a group 42 one group before the group 41 and a group 43 one group after the group 41 are radially displayed above and below the group 41, and groups 44 to 47 following the group 43 are also radially arranged outside the display area of the display screen 40. The user rotates all of the groups as windmill blades in accordance with the operations, described later, whereby the user can in turn change the group currently browsing.

Figure 6:
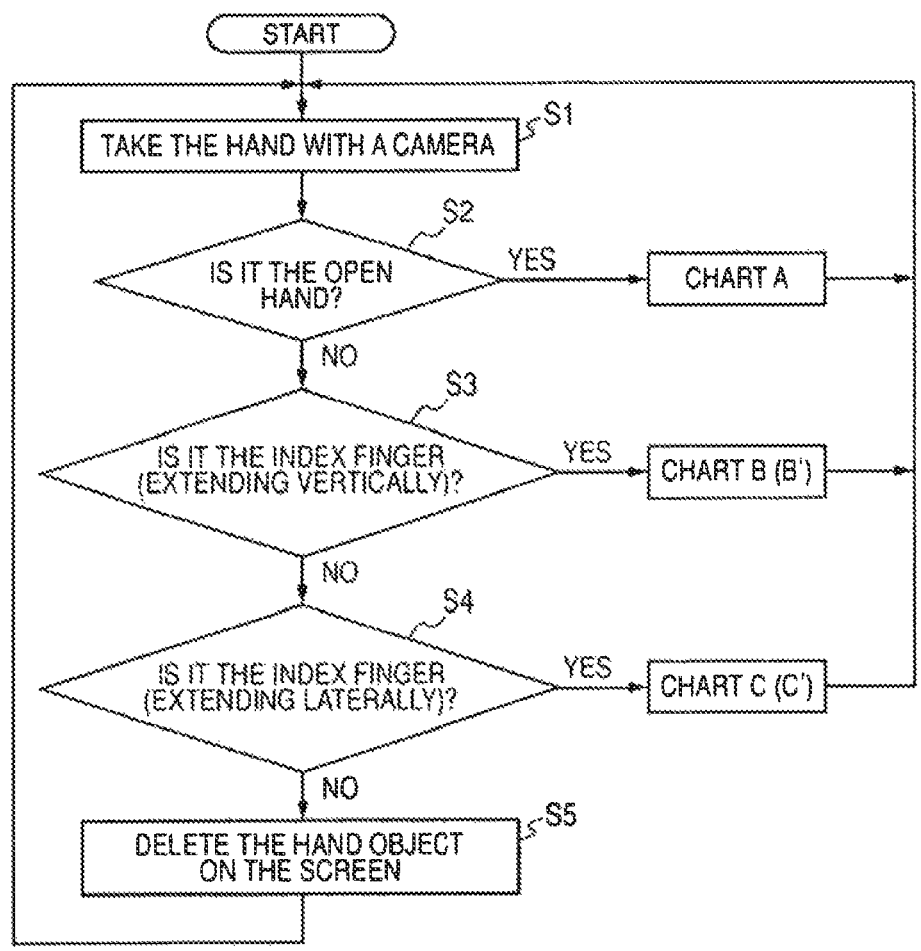
FIG. 6 shows a flow chart depicting the overall operation of the recording and reproducing apparatus according to the embodiment of the invention.

Here, in Step S1 shown in FIG. 6, as shown in FIG. 5B, when a user holds his/her hand 50 over the opposite surface (the surface of the window 11 and the lighting window 12) of the display device 13 with respect to the recording and reproducing apparatus 10, the optical part 20 inside the window 11 provided on the recording and reproducing apparatus 10 captures the manner as an image therein.

At this time, the lens inside the optical part 20 is fixed to the wide end. In addition, in the case in which the ambient light is too dark to take the user's hand, the lighting window 12 throws fill light for taking the user's hand lit by the light. Image signals taken through the window 11 are inputted to the CPU 25 to detect the position of the hand by using image recognition for the area currently taken. For example, as a scheme applicable to image recognition, such a scheme may be named that the skin tone distribution is detected based on color information about image signals, and the area including the contour of a hand is specified to compare the area with a plurality of templates of hand forms stored in the flash memory 24 in advance for determining whether there is a hand.

Figure 7:
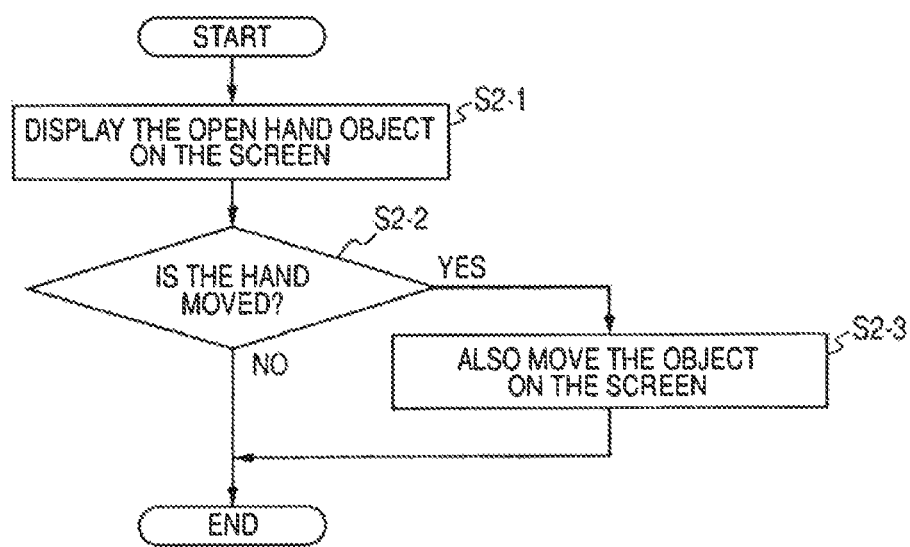
FIG. 7 shows a flow chart partially depicting the operation of the recording and reproducing apparatus according to the embodiment of the invention.

Here, as shown in FIG. 5E, when the user holds the hand 50 in an open hand (first form) as a gesture, the window 11 provided on the recording and reproducing apparatus 10 captures the manner as an image (Step S1), the CPU 25 determines whether it is an open hand (Step S2). Then, if the CPU 25 determines that it is an open hand, in Step S2-1 in FIG. 7 showing a chart A, an icon 51 in an open hand form (first object) is displayed on the display screen 40 with a shadow as shown in FIG. 5A. This shadow implies to the user by intuition that the icon 51 does not contact with the thumbnail on the display screen 40 and the thumbnail is not operable.

Figure 8B:
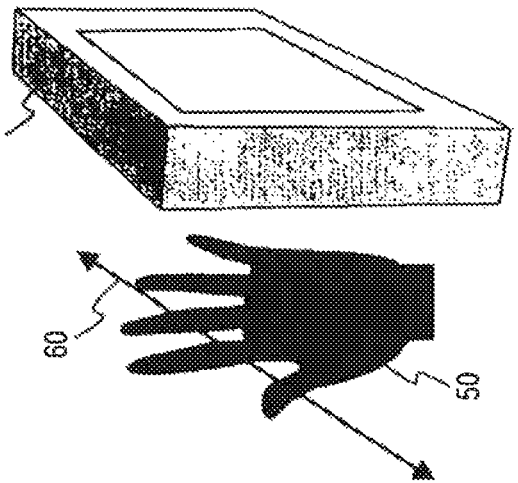
FIGS. 8A and 8B show an operating method in the browsing mode in the recording and reproducing apparatus according to the embodiment of the invention, FIG., 8A shows an illustration depicting a display screen.
Figure 8A:
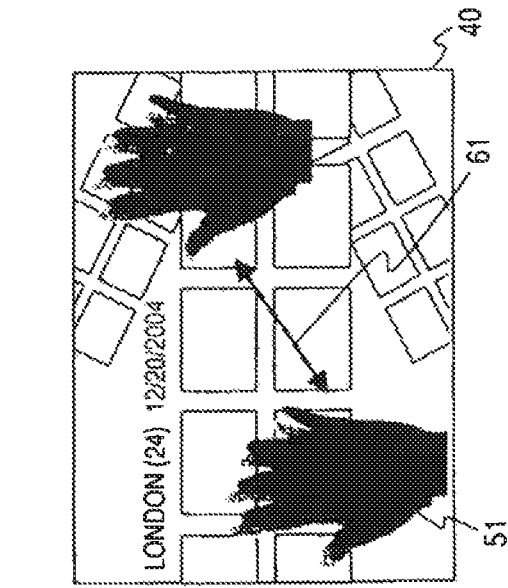

In this state, in Step S2-2 shown in FIG. 7, it is determined whether the hand 50 is moved. As shown in FIG. 8B, if it is determined that the user moves the hand 50 in the directions of an arrow 60, in Step S2-3 shown in FIG. 7, the icon 51 on the display screen 40 shows in FIG. 8A is also similarly moved in the directions of an arrow 61. Other than the directions of the arrow 60, when the user moves the hand 50 in the imaging area, the icon 51 is moved also on the display screen 40 correspondingly. In addition, if the hand 50 is moved out of the imaging area and the hand is not detected, the icon 51 on the display screen 40 is deleted (Step S5 shown in FIG. 6), whereas if the hand 50 again enters the imaging area and the hand is detected, the icon 51 is displayed on the display screen 40 (Step S2-1 shown in FIG. 7).

Figure 9B:
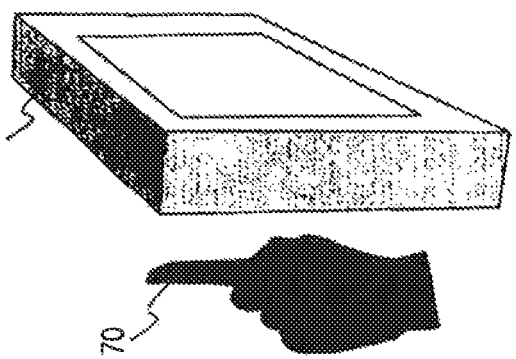
FIGS. 9A and 9B show an operating method in the browsing mode in the recording and reproducing apparatus according to the embodiment of the invention.
Figure 9A:
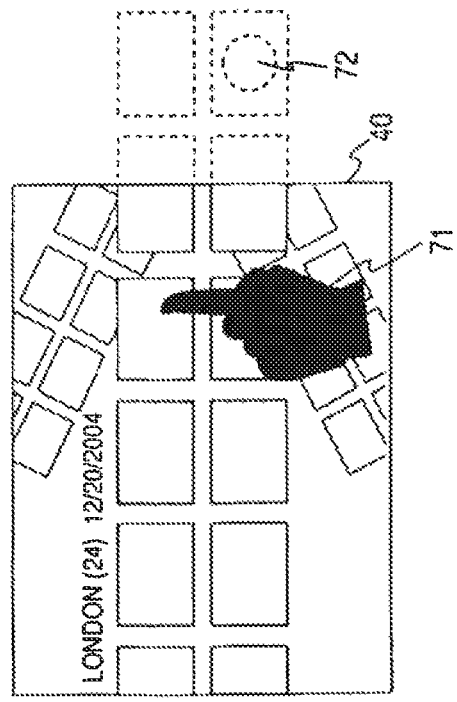

In addition, as shown in FIG. 9B, if the user holds his/her hand 70 in the state in which the user vertically stands only the index finger (second form), the window 11 provided on the recording and reproducing apparatus 10 captures this manner as an image (Step S1), and the CPU 25 determines whether it is the index finger extending vertically (Step S3). If it is determined that it is the index finger extending vertically, in Step S3-1 in a chart B shown in FIG. 10, an icon 71 in an index finger form extending vertically (second object) is displayed on the display screen 40 with no shadow as shown in FIG. 9A. There is no shadow here, and thus the icon 71 implies to the user by intuition that the icon 71 contacts with the thumbnail on the display screen 40 and the thumbnail is operable.

Figure 11B:
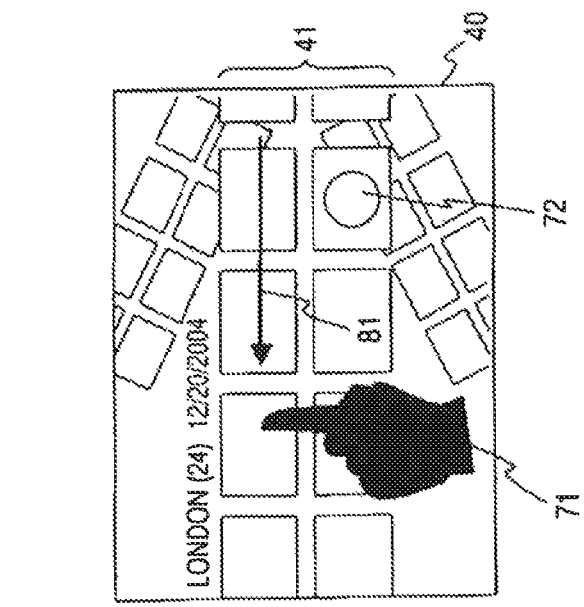
FIGS. 11A and 11B show an operating method in the browsing mode in the recording and reproducing apparatus according to the embodiment of the invention.
Figure 11A:
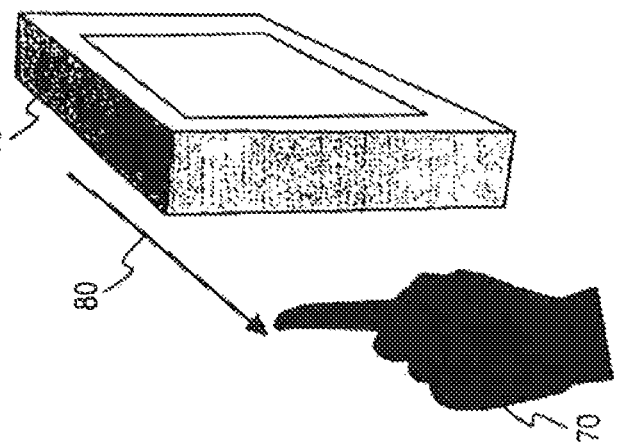

In this state, in Step S3-2 shown in FIG. 10, it is determined whether the hand 70 is moved. As shown in FIG. 11B, if it is determined that the user moves the hand 70 in the direction of an arrow 80, in Step S3-3 shown in FIG. 10, the icon 71 on the display screen 40 shown in FIG. 11A is also similarly moved in the direction of an arrow 81.

In Step S3-4 shown in FIG. 10, it is determined whether the hand 70 is moved horizontally and if it is determined that the hand moves horizontally, in Step S3-5, the group 41 on the display screen 40 is also scrolled horizontally, and the user can easily browse the contents of the group 41. For example, in FIG. 9A, in the case in which the user desires to see an image 72 outside the display area of the display screen 40, as shown in FIG. 11B, the user moves the hand 70 in a horizontal direction 80, whereby the icon 71 on the display screen 40 is moved in the horizontal direction 81 as shown in FIG. 11A, and the user can scroll the image 72 into the display area of the display screen 40.

In addition, in FIG. 11B, in the case in which the user moves the hand 70 in the opposite direction of the arrow 80, the group 41 is also scrolled in the direction opposite to the horizontal direction 81, the icon can be operated in the opposite direction similarly. In addition, if the hand 70 is moved out of the imaging area and the hand is not detected, the icon 71 on the display screen 40 is deleted (Step S5 shown in FIG. 6), whereas if the hand 70 again enters the imaging area and the hand is detected, the icon 71 is displayed on the display screen 40 (Step S3-1 shown in FIG. 10).

As the characteristic in the scroll, in the case in which the speed of moving the user's hand 70 is a certain threshold or above, the group 41 keeps scrolling with inertia. When the hand 70 is moved in the opposite direction to scrolling, the scrolling can be stopped. In the case in which the speed of moving the user's hand 70 is a certain threshold or below, the group 41 scrolls by a certain amount depending on the travel of the hand 70. Although the threshold is set in advance, the threshold may be set by the user him/herself.

As discussed above, the process that changes the speed of scrolling depending on the rate of travel of the user's hand 70 is executed along a flow chart shown in FIG. 12 depicting a chart B' shown in FIG. 6.

In FIG. 12, Steps S3-1 to S3-4 execute the same process steps as those in Steps S3-1 to 53-4 shown in FIG. 10. Next, in Step S30-1, it is determined whether the rate of travel of the user's hand 70 is a predetermined threshold or above, If it is equal to or greater than the threshold, in Step S30-2, the moving direction of the hand 70 is determined.

If the moving direction of the hand 70 is right, in Step 30-3, the group 41 (thumbnails) on the display screen 40 is kept scrolling in the right direction with inertia. After that, if it is determined that the hand 70 is moved left in Step S30-4, the scrolling is stopped (Step S30-5).

If the moving direction of the hand is left, in Step 30-6, the group 41 (thumbnails) on the display screen 40 is kept scrolling in the left direction with inertia. After that, if it is determined that the hand 70 is moved right in Step S30-7, the scrolling is stopped (Step S30-5).

In Step S30-1, if the rate of travel of the user's hand 70 is not equal to or greater than the threshold, in Step S30-8, it is determined whether the moving direction of the hand is right.

Then, if the moving direction of the hand 70 is right, in Step S30-9, the thumbnails of the group 41 on the display screen 40 are scrolled in the right direction by the number of images proportional to the rate of travel of the hand 70, whereas if the moving direction of the hand 70 is left, in Step S30-10, the thumbnails of the group 41 on the display screen 40 are scrolled in the left direction by the number of images proportional to the rate of travel of the hand 70.

Figure 13B:
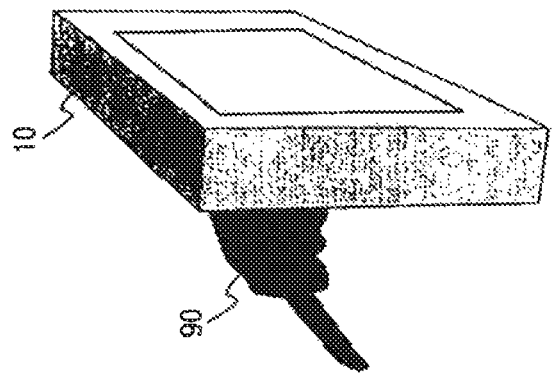
FIGS. 13A and 13B show an operating method in the browsing mode in the recording and reproducing apparatus according to the embodiment of the invention.

In addition, as shown in FIG. 13B, if the user holds his/her hand 90 in the state in which the user extends only the index finger horizontally (third form), the window 11 provided on the recording and reproducing apparatus 10 captures this manner as an image (Step S1 shown in FIG. 6), and the CPU 25 determines whether it is the index finger extending laterally (Step S4).

Figure 13A:
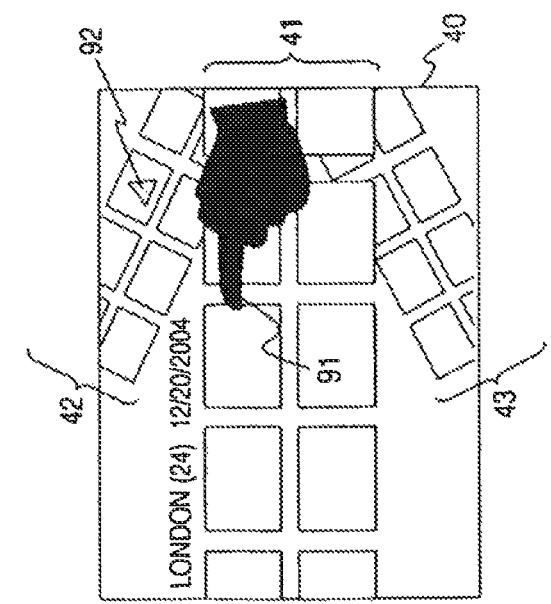
Figure 14:
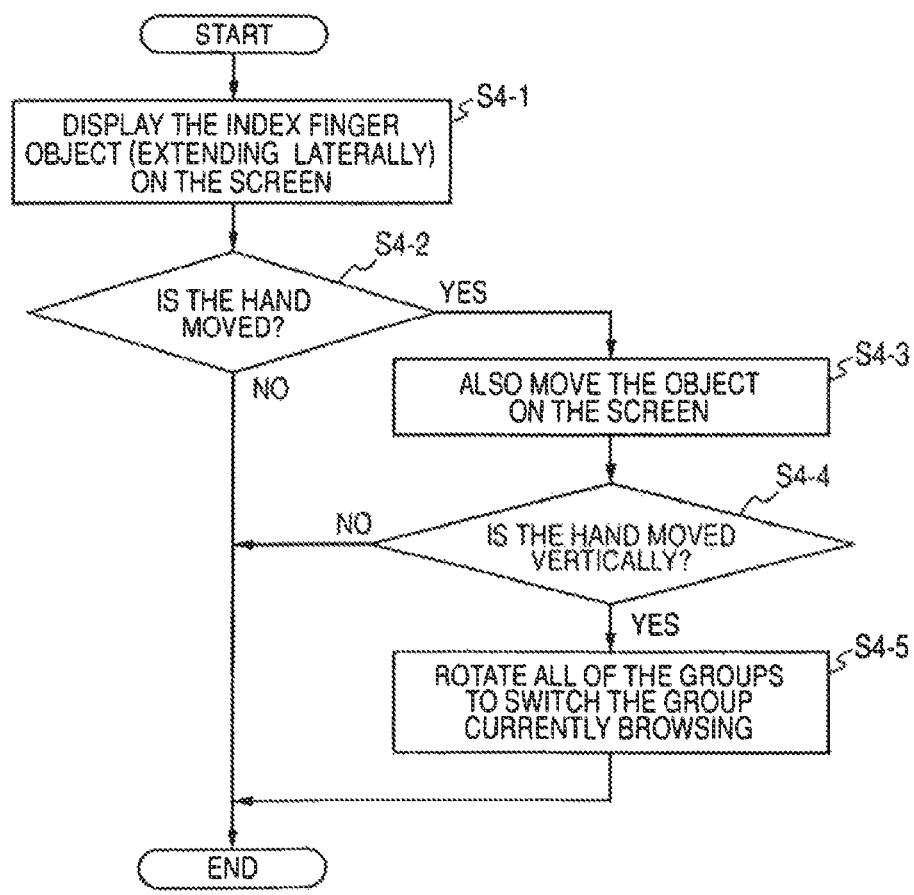
FIG. 14 shows a flow chart partially depicting the operation of the recording and reproducing apparatus according to the embodiment of the invention.

If it is determined that it is the index finger extending laterally, in Step S4-1 shown in FIG. 14 depicting a chart C shown in FIG. 6, an icon 91 (third object) in an index finger form is displayed on the display screen 40 with no shadow as shown in FIG. 13A. There is no shadow here, and thus the icon 91 implies to the user by intuition that the icon 91 contacts with the thumbnail on the display screen 40 and the thumbnail is operable.

Figure 15B:
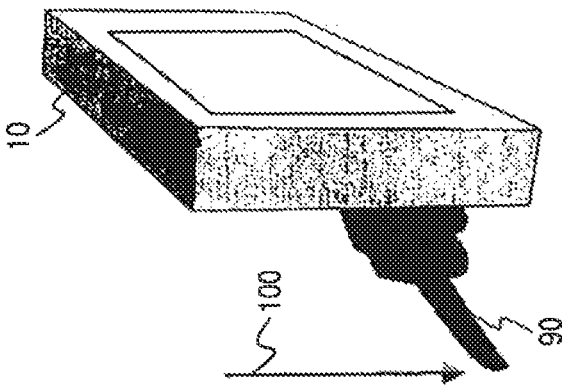
FIGS. 15A and 15B show an operating method in the browsing mode in the recording and reproducing apparatus according to the embodiment of the invention.

In this state, in Step S4-2 shown in FIG. 14, it is determined whether the hand 90 is moved. As shown in FIG. 15B, if it is determined that the user moves the hand 90 in the direction of en arrow 100 in Step S4-3 shown in FIG. 14, the icon 91 on the display screen 40 shown in FIG. 15A is also similarly moved in the direction of an arrow 101.

In Step 94-4 shown in FIG. 14, it is determined whether the hand 90 is moved vertically. If the hand 90 is moved vertically, in Step 34-5, the group 41 on the display screen 40 is rotated along a rotating direction 103 shown in FIG. 15A, and moved to the place at which the group 43 shown in FIG. 13A was located. At the same time, the group 42 shown in FIG. 13A is rotated along a rotating direction 102 shown in FIG. 15A, and moved to the place at which the group 41 shown in FIG. 13A was located. To the place at which the group 42 existed shown in FIG. 13A, a group 44 that is the subsequent group is rotated from outside the display screen 40, and displayed. Finally, a group name 104 of the group 42 is displayed on the display screen 40.

Figure 15A:
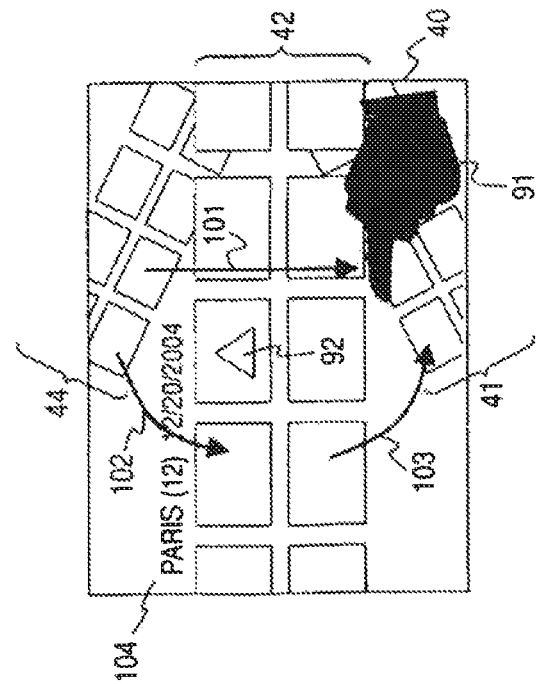

According to the operations, the user can change the group currently browsing from the group 41 shown in FIG. 13A to the group 42 shown in FIG. 15A. For example, in FIG. 13A, in the case in which the user desired to see an image 92 in the group 42, the user moves the hand 90 in a vertical direction 100 as shown in FIG. 15B, whereby as shown in FIG. 15A, the icon 91 on the display screen 40 is moved in a vertical direction 101, the group 42 is rotated in the direction of an arrow 102 correspondingly, the group 42 is turned to be the group currently browsing at a center, and then the user can see the image 92

In addition, in FIG. 15B, in the case in which the user moves the hand 90 in the direction opposite to the vertical direction 100, the icon 91 on the display screen 40 is also rotated in the opposite direction of the vertical direction 101, the group 41 is rotated in the opposite direction of the rotating direction 102 correspondingly, and then moved to the place at which the group 42 was located. In other words, the groups can be switched by the similar operations in the opposite direction. In addition, if the hand 90 is moved out of the imaging area and the hand is not detected, the icon 91 on the display screen 40 is deleted (Step S5 shown in FIG. 6), whereas if the hand 90 again enters the imaging area and the hand is detected, the icon 91 is displayed on the display screen 40 (Step S4-1 shown in FIG. 14).

As the characteristics of the operations in switching the groups, in FIG. 15B, in the case in which the speed of moving the user's hand 90 is a certain threshold or above, each of the groups keeps rotating with inertia. When the hand 90 is moved in the direction opposite to the rotation, the rotation can be stopped. In the case in which the speed of moving the user's hand 90 is a threshold or below, each of the groups is rotated by a predetermined number of times (rotating angle) depending on the travel of the hand 90. Although the threshold is set in advance, the threshold may be set by the user him/herself.

Figure 16:
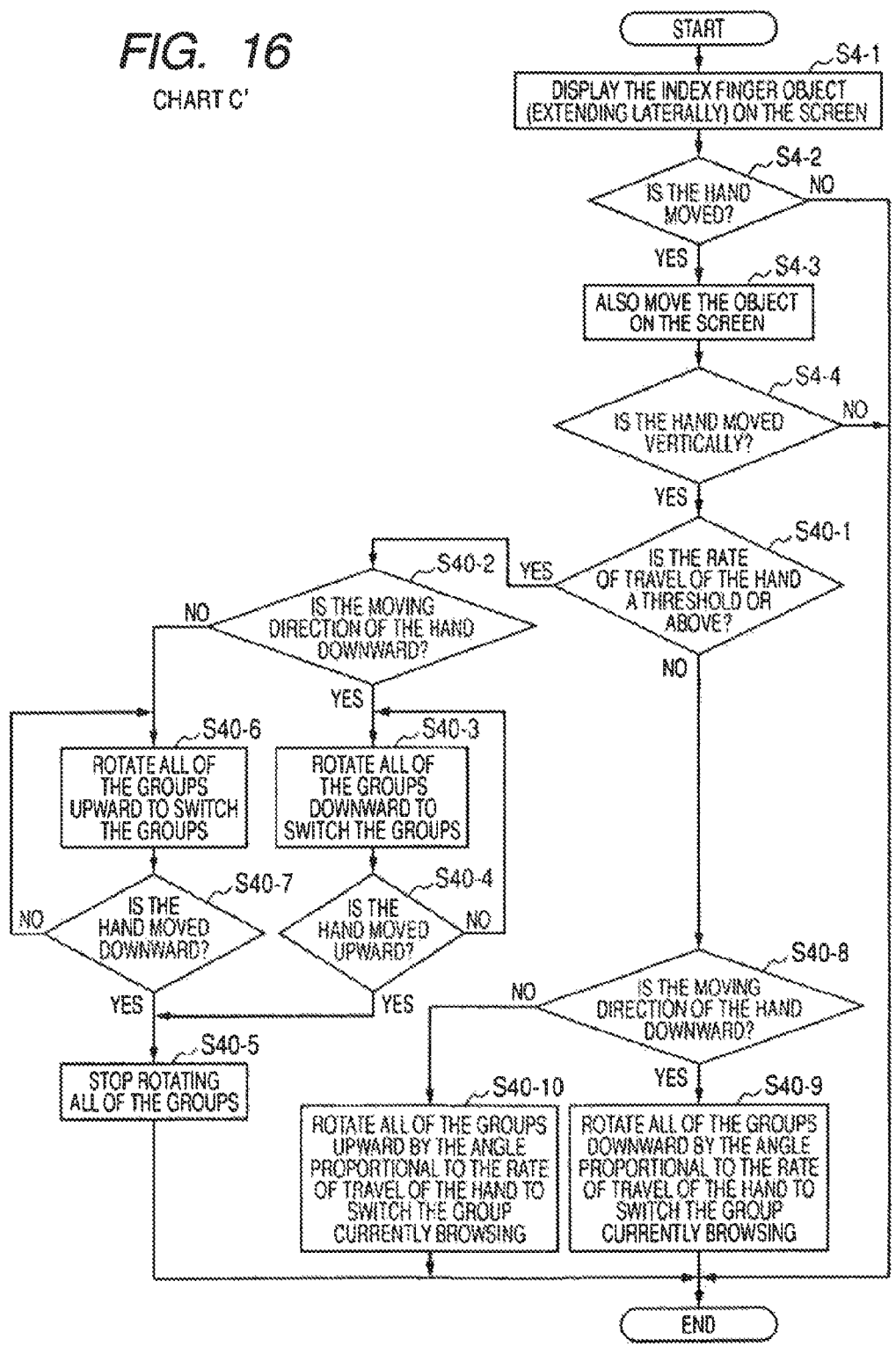
FIG. 16 shows a flow chart partially depicting the operation of the recording and reproducing apparatus according to the embodiment of the invention.

As discussed above, the process that changes the rotation speed of each of the groups depending on the rate of travel of the user's hand 90 is executed along a flow chart shown in FIG. 16 depicting a chart C' shown in FIG. 6, for example.

In FIG. 16, Steps S4-1 to S4-4 execute the same process steps as those in Steps S4-1 to S4-4 shown in FIG. 14. Subsequently, in Step S40-1, it is determined whether the rate of travel of the user's hand 90 is a predetermined threshold or above, If it is equal to or greater than the threshold, in Step S40-2, the moving direction of the hand 90 is determined.

If the moving direction of the hand 90 is downward, in Step 40-3, all of the groups on the display, screen 40 are rotated downward with inertia. After that, if it is determined that the hand 90 is moved upward in Step S40-4, the rotation is stopped (Step S40-5).

If the moving direction of the hand is upward, in Step 40-6, all of the groups on the display screen 40 are kept rotating upward with inertia. After that, if it is determined that the hand 90 is moved downward in Step S40-7, the rotation is stopped (Step S40-5).

In Step S40-1, if the rate of travel of the user's hand 90 is not equal to or greater than the threshold, in Step S40-8, it is determined whether the moving direction of the hand is downward.

Then, if the moving direction of the hand 90 is downward, in Step S40-9, all of the groups on the display screen 40 are rotated downward by the angle proportional to the rate of travel of the hand 90, whereas if the moving direction of the hand 90 is upward, in Step 640-10, all of the groups on the display screen 40 are rotated upward by the angle proportional to the rate of travel of the hand 90.

In addition, if the user holds the hand in the form other than the open hand, the index finger (extending vertically) or the index finger (extending laterally), the window 11 provided on the recording and reproducing apparatus 10 captures this manner as an image (Step S1 shown in FIG. 6), the CPU 25 recognizes that the form is other than these three forms (Step S2 to S4 shown in FIG. 6), and the hand icon on the display screen 40 is deleted (Step 65 shown in FIG. 6). In this state, the user can not scroll and rotate the groups and the images on the display screen 40, and the user can browse the images on the screen 40 at a slow pace.

In addition, in the embodiment, position information according to the GPS is used to group images. However, the scheme of grouping images is not limited thereto. For example, images may be grouped based on feature analysis according to position information according to dates and times or Wi-Fi (wireless LAN), face recognition of images or the like.

Next, a second embodiment of the invention will be described with reference to FIGS. 17 to 19.

As shown in FIG. 17B, a recording and reproducing apparatus 110 is a portable information display terminal with a camera such as a mobile telephone and a FDA, or a digital still camera, having an image display device 111. The image display device 111 is a device also serving as a liquid crystal display and an imaging apparatus equipped with a back light, in which a micro optical sensor is formed in a TFT transistor for a liquid crystal unity when an object is held over the image display device 111, the optical sensor in the liquid crystal unit can capture the form of the object as an image. In addition, also in dark places, an object is illuminated by rays of the back light to capture an image with the reflected light.

The internal configuration of the recording and reproducing apparatus 110 according to the embodiment is configured almost similar to that shown in FIG. 2. However, it is configured in which on the input side of the A/D converting part 22, detection signals of the optical sensor in the liquid crystal unit are taken instead of the outputs of the optical part 20 and the imager 21 shown in FIG. 2.

FIG. 17A shows a display screen 40 of the image display device 111 in the browsing mode in the recording and reproducing apparatus 110. The display screen 40 is identical, to that of the first embodiment.

Here, as shown in FIG. 17B, when a user holds his/her hand 50 over the image display device 111 in an open hand with respect to the recording and reproducing apparatus 110, the image display device 111 captures this manner as an image, The image signals captured by the image display device 111 are inputted to a CPU 25 to detect the position of the hand by using image recognition for the area currently taken. As a scheme applicable to image recognition, for example, similar to the description above, such a scheme may be named that the skin tone distribution is detected based on color information about image signals, and the area including the contour of a hand is specified to compare the area with a plurality of templates of hand forms stored in advance for determining whether there is a hand. Then, in the case in which the hand 50 of the user in the open hand is detected, as shown in FIG. 17A, an icon 51 in the open hand form is displayed on the display screen 40 with a shadow. The operating method of the open hand on the display screen 40 is the same as the operations shown in FIGS. 6 to 8, therefor omitting the descriptions here.

Figure 18B:
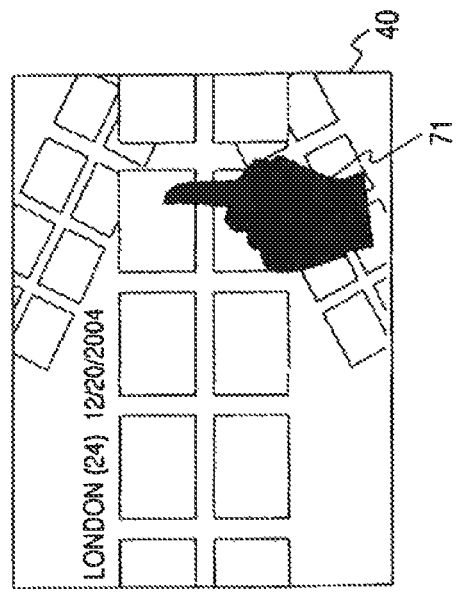
FIGS. 18A and 18B show an operating method in the browsing mode in the recording and reproducing apparatus according to the second embodiment of the invention.
Figure 18A:
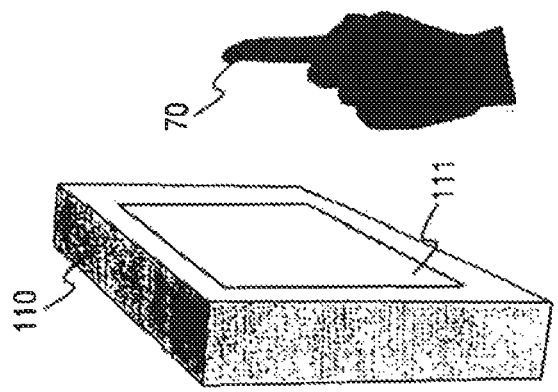

In addition, as shown in FIG. 18B, when the user holds his/her hand 70 in the state in which the user stands only the index finger vertically, the image display device 111 provided on the recording and reproducing apparatus 110 captures this manner as an image, and the CPU 25 detects it as the index finger (extending vertically). Then, as shown in FIG. 18A, an icon 71 of the index finger (extending vertically) is displayed on the display screen 40 with no shadow. The operating method of the index finger (extending vertically) on the display screen 40 is the same as the operations shown in FIGS. 9 to 12, therefor omitting the description.

In addition, as shown in FIG. 19B, when the user holds his/her hand 90 in the state in which the user extends only the index finger horizontally, the image display device 111 provided on the recording and reproducing apparatus 110 captures this manner as en image, and the CPU 25 detects it as the index finger (extending laterally), Then, as shown in FIG. 19A, an icon 91 of the index finger (extending laterally) is displayed on the display screen 40 with no shadow. The operations of the index finger (extending laterally) are the same as the operations shown in FIGS. 13 to 16, therefor omitting the description.

In addition, in the case in which the user holds the hand in the form other than the open hand, the index finger (extending vertically) or the index finger (extending laterally), the image display device 111 provided on the recording and reproducing apparatus 110 captures this manner as an image, and the CPU 25 recognizes this form other than the three forms to delete the hand icon on the display screen 40 (a flow chart shown in FIG. 6). In this state, as similar to the case of the first embodiment, the user can not scroll and rotate the groups and the images on the display screen 40, and the user can browse the images on the display screen 40 at a slow pace.

In addition, switching images on the display screen 40 (scrolling the group and rotating all of the groups) is not limited to these three forms according to the hands 50, 70, and 90 of the user. The other forms, for example, a closed first or a closed hand with index and middle fingers extended may be used or a plurality of objects in different forms may be used.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus comprising:
a recording unit configured to store first images in a first group and second images in a second group;
a display unit configured to display the first images in a first row and the second images in a second row simultaneously, the first image group being arranged forward of the second image group in a first direction parallel to a predetermined plane, and the second image group being arranged in a second direction; and
a detecting unit configured to detect first movement of an operation object in the first direction and second movement of the operation object in a third direction, the operation object being a part of a human body or an object, the third direction intersecting with the first direction in the predetermined plane;
wherein the display unit is further configured to
move the first image group in the first direction in accordance with the detected first movement, and
move the first image group in the third direction in accordance with the detected second movement such that the first image group is moved to be arranged behind the second image group, and
wherein each of the recording unit, the display unit, and the detecting unit is implemented via at least one processor.

2. The apparatus according to claim 1, wherein the first image group is displayed to initially be located at a center of a display.

3. The apparatus according to claim 1, wherein the third direction is a vertical direction.

4. The apparatus according to claim 1, wherein the second group is moved in accordance with the second movement so as to be displayed at a center of a display at a location where the first group was displayed prior to the moving of the first image group.

5. The apparatus according to claim 1, wherein the second image group is displayed in a radial configuration above or below the first image group.

6. The apparatus according to claim 1, wherein the operation object is a finger.

7. The apparatus according to claim 1, wherein the detecting unit detects the second movement of the operation object that is making a predetermined gesture, and the first image group and the second image group are displayed to be moved in the third direction in accordance with the second movement of the operation object making the predetermined gesture.

8. The apparatus according to claim 1, wherein the display unit is configured to move the first image group in accordance with the detected second movement such that the first image group is arranged in a fourth direction and the second image group is arranged in the first direction.

9. The apparatus according to claim 8, wherein the first direction, the second direction, the third direction, and the fourth direction are different from each other.

10. The apparatus according to claim 1, wherein the first direction obliquely extends with respect to the second direction.

11. A display control method comprising:
presenting display information about first images in a first group and second images in a second group to display, with a display unit, the first images in a first row and the second images in a second row simultaneously, the first image group being arranged forward of the second image group in a first direction parallel to a predetermined plane, and the second image group being arranged in a second direction; and
acquiring movement information about first movement of an operation object in the first direction and second movement of the operation object in a third direction, the operation object being a part of a human body or an object, the third direction intersecting with the first direction in the predetermined plane;
presenting control information to the display unit, to
move the first image group in the first direction in accordance with the first movement, and
move the first image group in the third direction in accordance with the second movement such that the first image group is moved to be arranged behind the second image group.

12. A non-transitory computer-readable medium having embodied thereon a program, which when executed by a computer causes the computer to execute a display control method, the method comprising:
presenting display information about first images in a first group and second images in a second group to display, with a display unit, the first images in a first row and the second images in a second row simultaneously, the first image group being arranged forward of the second image group in a first direction parallel to a predetermined plane, and the second image group being arranged in a second direction;

acquiring movement information about first movement of an operation object in the first direction and second movement of the operation object in a third direction, the operation object being a part of a human body or an object, the third direction intersecting with the first direction in the predetermined plane; and presenting control information to the display unit, to
move the first image group in the first direction in accordance with the first movement, and
move the first image group in the third direction in accordance with the second movement such that the first image group is moved to be arranged behind the second image group.

* * * * *